(12) United States Patent
Seneff et al.

(10) Patent No.: US 7,714,479 B2
(45) Date of Patent: May 11, 2010

(54) SEGMENTED COMPOSITE ROTOR

(75) Inventors: Richard Lex Seneff, Indianapolis, IN (US); Andrew D. Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 405 days.

(21) Appl. No.: 11/901,768

(22) Filed: Sep. 19, 2007

(65) Prior Publication Data

US 2009/0072639 A1  Mar. 19, 2009

(51) Int. Cl.
*H02K 1/22* (2006.01)
(52) U.S. Cl. ............. 310/268; 310/156.21; 310/156.37
(58) Field of Classification Search ......... 310/113–114, 310/268, 271, 261.1, 156.21, 156.31, 156.37, 310/156.38
See application file for complete search history.

(56) References Cited

U.S. PATENT DOCUMENTS

| | | | | |
|---|---|---|---|---|
| 4,006,375 A * | 2/1977 | Lyman et al. | ............. | 310/49.37 |
| 4,629,920 A * | 12/1986 | Hermann | ............... | 310/156.35 |
| 4,633,149 A * | 12/1986 | Welterlin | ............... | 318/400.41 |
| 4,996,457 A * | 2/1991 | Hawsey et al. | ............. | 310/268 |
| 5,099,182 A * | 3/1992 | Isaacson et al. | ........ | 318/400.01 |
| 5,334,899 A * | 8/1994 | Skybyk | ............. | 310/268 |
| 5,396,140 A * | 3/1995 | Goldie et al. | ............. | 310/268 |
| 5,793,137 A * | 8/1998 | Smith | ............. | 310/114 |
| 5,982,070 A | 11/1999 | Caamano | ............. | 310/216 |
| 6,011,337 A * | 1/2000 | Lin et al. | ............. | 310/156.37 |
| 6,172,589 B1 | 1/2001 | Fujita et al. | ............. | 335/306 |
| 6,674,214 B1 | 1/2004 | Knorzer et al. | ............. | 310/268 |
| 6,751,842 B2 | 6/2004 | Roesel, Jr. et al. | ............ | 29/598 |
| 6,995,489 B2 | 2/2006 | Ehrhart et al. | ......... | 310/156.31 |
| 7,098,569 B2 | 8/2006 | Ong et al. | ............. | 310/261 |
| 2005/0093393 A1 * | 5/2005 | Hirzel | ............. | 310/268 |
| 2006/0131978 A1 * | 6/2006 | Hirzel et al. | ............. | 310/168 |

FOREIGN PATENT DOCUMENTS

JP      10210690      8/1998

* cited by examiner

*Primary Examiner*—Thanh Lam
(74) *Attorney, Agent, or Firm*—Ernest D. Buff & Associates, LLC; Ernest D. Buff; Gordon E. Fish

(57) ABSTRACT

A composite rotor for an axial airgap, permanent magnet dynamoelectric machine comprises a plurality of magnet subassemblies adhesively bonded together to form the rotor. Each magnet subassembly comprises a rotor permanent magnet and an optional spacer. A fibrous belt is wrapped around the periphery of each subassembly to provide high tensile strength at least along the radial sides of the subassembly. The belt is preferably infiltrated with an adhesive agent, such as an epoxy resin, that is used to bond the subassemblies. The rotor is thereby provided with high strength and low mass, making it suitable for use in a high-speed, high pole count electric machine.

33 Claims, 4 Drawing Sheets

Fig. 2
Fig. 3
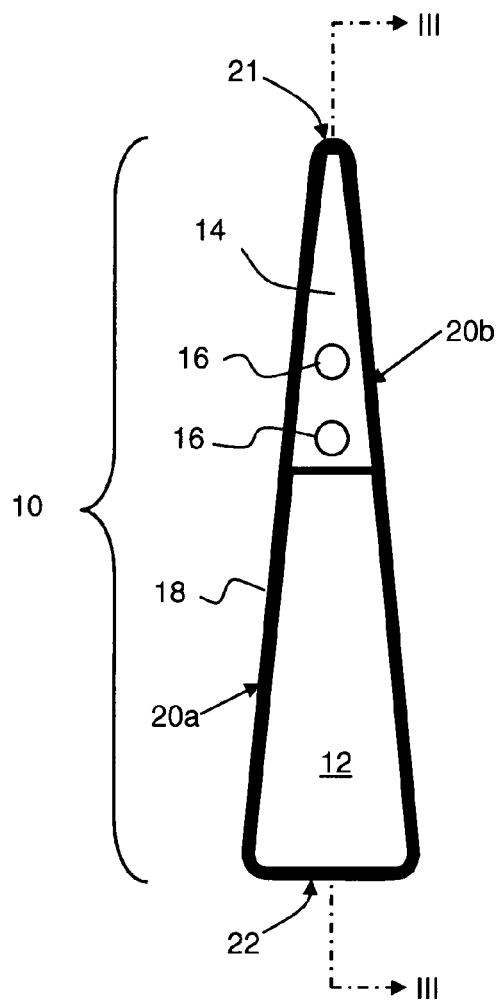
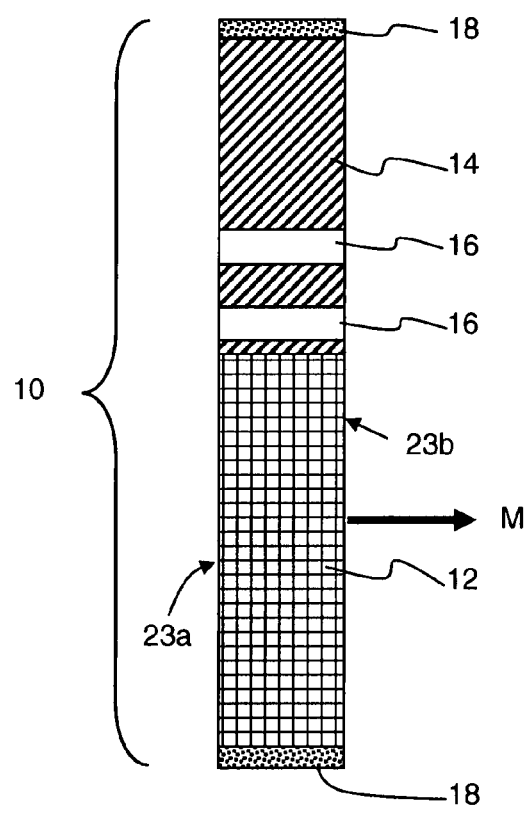

SEGMENTED COMPOSITE ROTOR

BACKGROUND OF THE INVENTION

1. Field of the Invention

The present invention relates to a segmented composite rotor; and more particularly, to a rotor for a permanent magnet, dynamoelectric machine, a method for fabricating such a rotor to provide it with improved strength and reliability for operating the machine at high rotational speeds, and a dynamoelectric machine incorporating such a rotor.

2. Description of the Prior Art

The electric motor and generator industry is continuously searching for ways to provide dynamoelectric, rotating machines with increased efficiencies and power and torque densities. As used herein, the term "motor" refers to all classes of motoring and generating machines which convert electrical energy to rotational motion and vice versa. Such machines include devices that may alternatively function as motors, generators, and regenerative motors. The term "regenerative motor" is used herein to refer to a device that may be operated as either an electric motor or a generator. A wide variety of motors are known, including permanent magnet, wound field, induction, variable reluctance, switched reluctance, and brush and brushless types. They may be energized directly from a source of direct or alternating current provided by the electric utility grid, batteries, or other alternative source. Alternatively, they may be supplied by current having the requisite waveform that is synthesized using electronic drive circuitry. Rotational energy derived from any mechanical source may drive a generator. The generator's output may be connected directly to a load or conditioned using power electronic circuitry. Optionally, a given machine is connected to a mechanical device that functions as either a source or sink of mechanical energy during different periods in its operation. The machine thus can act as a regenerative motor, e.g. by connection through power conditioning circuitry capable of four-quadrant operation. In a generator application, the mechanical device is often termed a "prime mover."

Rotating machines ordinarily include a stationary component known as a stator and a rotating component known as a rotor. The rotor is ordinarily mounted on a shaft and supported for rotation in facing relationship with the stator. The shaft is connected to a load or a prime mover for transmission of rotational mechanical energy and the associated torque.

Usually, the rotor and stator are held in position by a frame in such a fashion as to permit continuous mechanical rotation of the rotor relative to the stator. The rotor is ordinarily associated with a shaft supported by bearings that support the rotor for its rotation and constrain the rotor against forces tending to cause the shaft to move either radially or axially. The rotor and shaft may be constructed as an integral assembly, or they may be separate parts secured by fasteners, press fitting, or other known means providing an attachment sufficiently robust to permit torque transfer between the rotor and shaft. It will be understood by those skilled in the art that a rotating machine may comprise plural, mechanically connected rotors and plural stators.

Virtually all rotating machines are conventionally classifiable as being either radial or axial airgap types. That is to say, adjacent faces of the rotor and stator are separated by a small airgap traversed by magnetic flux linking the rotor and stator. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis. Axial airgap motors are often called disk or pancake motors, reflecting their short aspect ratio. That is to say, in these designs, the ratio of length along the shaft direction to the overall diameter is ordinarily much lower than in radial machines, which usually have the overall form of an elongated cylinder.

U.S. Pat. No. 6,995,489 to Ehrhart et al. provides a construction for an internal, permanent magnet rotor for a radial airgap electric machine. In an embodiment, a generally cylindrical rotor comprising a plurality of rotor permanent magnets is encircled about its circumference by a bandage, for which ceramic fiber is a preferred material. The fibrous material is said to provide strength in the circumferential direction and to maintain structural integrity of the rotor against centrifugal forces. A circumferential fibrous material is also disclosed for an external permanent magnet rotor for a radial airgap machine. Fibers externally wound around radial airgap rotors are also disclosed by Japanese Patent Publication JP10210690 to Kawamura, U.S. Pat. No. 6,751,842 to Roesel, Jr., et al., and U.S. Pat. No. 7,098,569 to Ong et al. U.S. Pat. No. 6,674,214 to Knörzer et al. provides an axial airgap machine in which the rotor comprises permanent magnet pieces embedded in a fiber- or fabric-reinforced plastic. U.S. Pat. No. 5,982,070 to Caamano provides a dielectric housing in which stator magnetic pieces are disposed.

Although the preponderance of present commercial devices have radial gap designs, there has been renewed interest in the potential of axial airgap machines for some applications, especially for situations in which the short aspect ratio geometry is more favorable. FIG. 1 depicts one form of permanent magnet rotor useful in an axial airgap, dynamoelectric machine. The power and torque capabilities of axial airgap devices can be increased either by increasing the device diameter or by employing a stack of multiple rotors and stators.

However, rotor design and construction are generally regarded as more difficult in the axial geometry. High speed designs are considered particularly challenging as a result of the combined axial and radial forces encountered during operation. Designers must carefully design rotors that are not prone to excitation of any normal modes that might lead to excess vibration, or even catastrophic mechanical failure, under foreseeable operating conditions.

Except for certain specialized types, motors and generators generally employ soft magnetic materials of one or more types. By "soft magnetic material" is meant one that is easily and efficiently magnetized and demagnetized. The energy that is inevitably dissipated in a magnetic material during each magnetization cycle is termed hysteresis loss or core loss. The magnitude of hysteresis loss is a function both of the excitation amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of motor, the permanent and soft magnetic materials may be disposed either on the rotor or stator.

A number of applications in current technology, including widely diverse areas such as high-speed machine tools, aerospace motors and actuators, and compressor drives, require electrical motors operable at high speeds (i.e., high rpm), many times in excess of 15,000-20,000 rpm, and in some cases up to 100,000 rpm. High speed electric machines are almost always manufactured with low pole counts, lest the magnetic materials in electric machines operating at higher frequencies experience excessive core losses that contribute to inefficient motor design. This is mainly due to the fact that the soft material used in the vast majority of present motors is a silicon-iron alloy (Si—Fe). It is well known that losses resulting from changing a magnetic field at frequencies greater than about 400 Hz in conventional Si—Fe-based materials causes the material to heat, oftentimes to a point where the device cannot be cooled by any acceptable means.

However, further problems arise in electric machines from circulating eddy currents. These problems are accentuated in devices operating at high frequencies and high speeds. In accordance with Faraday's law, eddy currents are induced in conductive elements of the rotor, shaft, and associated structure as a consequence of time-varying magnetic flux threading these components.

More specifically, as the rotor rotates relative to the stator, the rotor magnets experience cyclic differences in permeance coefficient during the course of each rotation, as the rotor magnets alternately pass between alignment with the teeth of the stator core and positions centered in the gaps between the stator teeth. As a result of this variation in permeance, flux within the rotor magnets and associated structure changes, thus inducing eddy currents.

Circulating eddy currents bring a number of undesirable effects. In some cases, they are high enough to cause significant heating in the rotor. The heating, in turn, is likely to cause irreversible loss of magnetization of the rotor permanent magnets, thereby drastically reducing device output. In extreme cases, the heating may even be severe enough to reduce the lifetime of the rotor magnets or destroy them.

A potentially even more serious problem arises from any current paths that traverse the shaft bearings. Without being bound by any theory, it is believed that such shaft currents arise from eddy current effects induced in accordance with Faraday's law. Inevitably, shaft currents cause sparking and gradual erosion of bearing surfaces. This in turn results in excess friction that can cause the bearings to overheat and even fail catastrophically.

To counter this danger, machine designs often incorporate a conductive path provided by brushes engaged with slip rings to provide an alternate path diverting any circulating shaft currents away from the bearings. This expedient may protect the bearing surfaces, but does not eliminate heating and its effects, not least the loss of energy efficiency. Moreover, the brushes and slip rings themselves are expensive, require regular maintenance or replacement, and occupy valuable shaft space. Rotor designs that minimize or eliminate deleterious shaft eddy current effects are thus highly sought.

Accordingly, there remains a need in the art for electrical devices that are simple and economical to construct and provide high operational efficiency. Ideally, an improved machine would provide higher efficiency of conversion between mechanical and electrical energy forms by using low-loss soft magnetic material and advanced, high energy product permanent magnet materials. An ideal machine would also provide high power and torque density computed on either a volumetric or mass basis, and with or without liquid or gas cooling. Improved efficiency in generating machines powered by fossil fuels would concomitantly reduce air pollution. The machine would be smaller and lighter and would satisfy more demanding requirements of torque, power, and speed. Cooling requirements would be reduced. Motors operating from battery power would operate longer for a given charge cycle. For certain applications, improved axial airgap machines are especially desired because of their size and shape and their particular mechanical attributes.

SUMMARY OF THE INVENTION

In one aspect, the present invention provides a rotor for a permanent magnet, axial airgap, dynamoelectric machine. The rotor employs a composite structure in which an adhesively bonded, fibrous material is used to provide high strength with low mass. More specifically, the rotor comprises magnet subassemblies shaped so that a plurality of these subassemblies can be collectively assembled to form an annulus. Each magnet subassembly has opposing subassembly faces and a periphery defined by two radial sides and inner and outer sides. The magnet subassembly comprises a rotor magnet that has substantially parallel opposing faces and is appointed to be magnetized in either sense along a preferred magnetization direction that is substantially perpendicular to the opposing faces. Optionally, each subassembly also includes a spacer located radially inward of the magnet.

Each subassembly is wrapped with a fibrous belt that has a length direction extending around the periphery of the magnet subassembly. The belt provides high tensile strength at least along the radial sides of each magnet subassembly. An adhesive, such as an epoxy resin or any other agent providing the requisite strength, is supplied at least on the radial sides of the magnet subassemblies. The adhesive is activated to bond together circumferentially adjacent ones of these adjacent subassemblies on their adjacent radial sides to form the rotor structure. Preferably, the adhesive infiltrates the fibrous belt on the radial sides; more preferably, the entirety of each belt is so infiltrated. In some implementations, the rotor assembly is heated slightly and/or exposed to a vacuum to promote the infiltration and facilitate removal of unwanted air bubbles from the adhesive.

In preferred embodiments, a rotor structure constructed in this manner has high strength and low weight, rendering it useful for electric machines, especially those operating at high rotational speeds. Such a configuration permits the expensive composite reinforcing material to be used efficiently, with fibers concentrated and preponderantly oriented in the direction requiring high strength, and with little if any waste of the reinforcing material.

In another aspect, the invention provides a method for constructing a permanent magnet rotor for an axial airgap, dynamoelectric machine. In one implementation, the method comprises the steps of: providing a plurality of magnet subassemblies, disposing the subassemblies to form an annulus, supplying adhesive at least between adjacent radial sides of circumferentially adjacent ones of the magnet subassemblies, and activating the adhesive to bond the subassemblies to form into the rotor. Each subassembly has opposing subassembly faces and a periphery defined by two radial sides and inner and outer sides, and includes a rotor magnet and, optionally, a spacer located radially inward of the rotor magnet. A fibrous belt wraps each subassembly to provide mechanical strength. The length direction of the belt extends around the periphery of the magnet subassembly, including both the rotor magnet and the spacer, if present. The belt provides high tensile strength at least along the radial sides of the subassembly. The subassemblies are shaped to permit a plurality of them to be assembled collectively into an annulus, by joining circumferentially adjacent ones of the subassemblies along their adjacent radial sides. While the present method can be used to form rotors having any number of rotor poles, it is especially useful in constructing high pole count rotors. It will be understood that the foregoing process steps may be carried out in any workable order.

In another aspect, the invention provides a permanent magnet rotor which can be made using the foregoing construction method or other suitable technique.

In still another aspect, there is provided a permanent magnet, axial airgap dynamoelectric machine employing at least one stator and at least one rotor of the type described above.

In preferred embodiments, the foregoing composite rotor, and electric machines incorporating it, provide high efficiency and ability to operate at high rotational speeds. Such a machine is compact, lightweight, and efficiently constructed. Designs may incorporate very thin permanent magnet sections, improving the cost effectiveness of the device. Thinner magnets and elimination of the metallic support structure needed in previous rotors both reduce the rotor weight, minimizing its moment of inertia. In addition, a composite rotor markedly minimizes or eliminates deleterious circulating eddy currents, especially if the reinforcing fiber is non-conductive. The bonded composite reinforcement nevertheless provides the rotor with sufficient rigidity and high strength, as for high-speed operation.

BRIEF DESCRIPTION OF THE DRAWINGS

The invention will be more fully understood and further advantages will become apparent when reference is had to the following detailed description of the preferred embodiments of the invention and the accompanying drawing, wherein like reference numerals denote similar elements throughout the several views, and in which:

FIG. 2 depicts in a plan view a form of magnet subassembly useful in constructing a permanent magnet rotor for an axial airgap dynamoelectric machine;

FIG. 3 depicts in a cross-sectional view the magnet subassembly of FIG. 2, taken at view III-III indicated in FIG. 2;

DETAILED DESCRIPTION OF THE INVENTION

Figure 1:
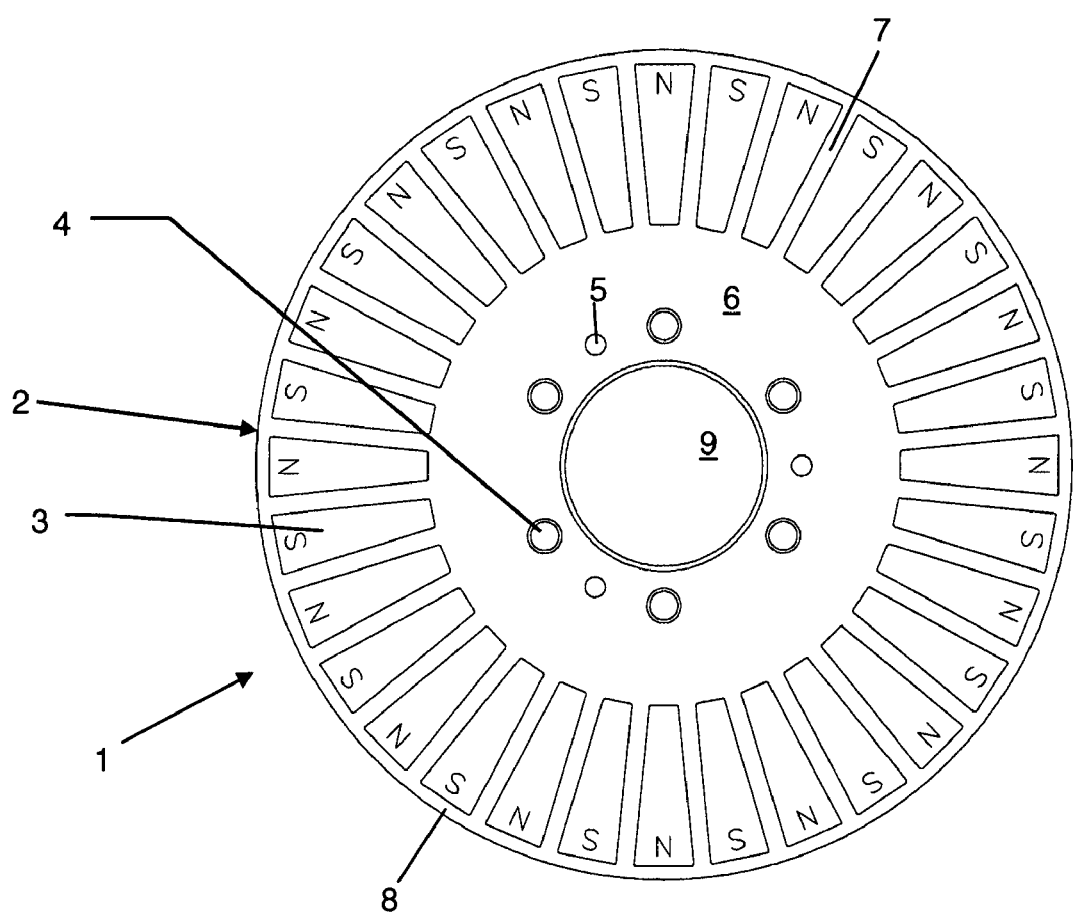
FIG. 1 depicts in a plan view a permanent rotor for a prior art axial airgap dynamoelectric machine

Referring to FIG. 1, there is depicted a permanent magnet rotor 1 used in a prior art, axial airgap, dynamoelectric machine. Rotor 1 is generally has the shape of a flat, low aspect ratio disk or plate. It comprises a plurality of permanent magnets 3 spaced around the circumference of support structure 2. The rotor is connected to a machine shaft in a conventional manner that may include a hub on either or both sides or other like structure (not shown) that engages support structure 2 and is attached to it using a plurality of fasteners, such as bolts or rivets, passed through mounting holes 4 symmetrically disposed on a bolt circle around a central aperture 9 through which the machine shaft passes. Alignment holes 5 are optionally provided to engage alignment pins in the hubs. Support structure 2 is typically fabricated from a non-magnetic metal by forming the required openings in an initially solid plate, e.g. by any conventional machining method. The openings include a requisite number of apertures sized to accommodate magnets 3, as well as a central shaft aperture 9, mounting holes 4 and alignment holes 5. Ordinarily, the magnet apertures extend through the full thickness of support structure 2, so that opposite faces of magnets 3 are exposed on opposites faces of rotor 1. Formation of these openings leaves a structure resembling that of a wagon wheel, with hub 6, spokes 7, and rim 8. Structure 2 is also known as a spider. Circumferentially adjacent magnets 3 in FIG. 1 have opposite magnetic polarity, as indicated by N and S, denoting north and south magnetic poles.

Support structure 2 must satisfy exacting electrical, magnetic, and mechanical requirements, making it relatively expensive to manufacture. Often structure 2 is composed of a stainless steel alloy, which has high mass density and is relatively expensive and difficult to machine. Other non-magnetic materials sometimes used include aluminum, which is lighter and easier to machine, but provides much lower strength. Although much more costly to make and use, titanium is another alternative because of its high strength.

During operation, especially at high speed, a rotor in an axial airgap machine experiences strong mechanical forces in multiple directions. The magnets 3 of rotor 1 are commonly secured in their apertures by epoxy or other adhesive. This adhesive bond and the containment afforded by rim 8 must provide centripetal force to constrain the magnets radially inwardly. Magnets 3 also experience axial attraction toward the facing stator. Structure 2 must be sufficiently strong and rigid to inhibit flexure that would warp the rotor away from flatness, in a mode sometimes termed "oil-canning."

The sizing of the elements of prior art rotor 1 depends on an interplay between the mechanical and magnetic properties of the constituent materials, operational requirements for the machine, and cost and manufacturability considerations. It has been found that the availability of advanced, high performance magnetic materials theoretically permits the design of machines capable of operating at increased speeds and with improved energy efficiency and power and torque densities. However, the designer's freedom is often constrained by practical considerations. The present configuration permits the construction of designs heretofore unattainable.

High performance applications typically are best addressed with the high energy product and high coercivity magnetic materials. Ideally, permanent magnets useful in dynamoelectric machines have a high saturation magnetization, a high maximum energy B—H product, and an intrinsic coercivity high enough to provide a completely linear second-quadrant intrinsic B—H loop. This behavior is well approximated by the best available oriented, sintered, rare earth base permanent magnet materials, including both SmCo and FeNdB based materials. The present techniques and configuration are beneficially used with these materials, but may also be usefully employed with other less ideal materials. For example, hard ferrites are less expensive than rare earth magnets and can have a linear loop, but have lower magnetization and thus lower energy product. However, high quality permanent magnets, especially rare earth base magnets, typically represent the largest single cost item in a machine. Designers thus strive for machine configurations that minimize the volume of high-cost material needed. The high coercivity of these magnets permits design using a relatively low permeance coefficient, which corresponds to selection of a relatively thin magnet. That is to say, the rotor magnets may have the general shape of a thin plate, i.e., a planar geometry in which the thickness of the magnet (as measured in the direction perpendicular to the plane) is much less than any characteristic dimension in the plane. The magnet has a preferred magnetization direction in the thickness direction. It will be understood that the magnet may be magnetized substantially in its thickness direction in either polarity by applying a sufficiently large magnetizing field that is directed in the desired sense along the thickness direction.

One possible approach to the design of high efficiency machine relies on techniques disclosed in U.S. Pat. No. 7,230,361 to Hirzel, which is incorporated herein in the entirety by reference thereto. These techniques permit design of an axial airgap device with magnets considerably thinner than heretofore contemplated. A thinner rotor would also have a beneficially reduced weight and moment of inertia. However, constructing a rotor of the type shown in FIG. 1 in some cases would reduce spoke and rim thickness unacceptably, leaving support structure 2 insufficiently robust to provide the mechanical strength and rigidity requisite for high speed operation.

One aspect of the invention provides alternatives to a rotor constructed in accordance with FIG. 1. Referring now to FIGS. 2-3 there is shown a magnet subassembly 10 useful in assembling a permanent magnet rotor of a different construction for an axial airgap dynamoelectric machine. Subassembly 10 includes a generally wedge-shaped permanent magnet 12 and an optional spacer section 14, which may further include one or more mounting holes 16. Subassembly 10 further includes an encircling reinforcement 18, which may be a fibrous belt comprised of any suitable material providing sufficient strength along its length. Subassembly 10 has a periphery defined by radial sides 20a, 20b, inner side 21, and outer side 22. The periphery surrounds opposing subassembly faces 23a, 23b.

A preferred material for reinforcement 18 is carbon tow, although other suitable materials providing high strength may also be used. For example, the fibrous belt may comprise fibers of at least one fiber type selected from the group consisting of carbon, glass, para-aramid, and extended chain high modulus polyethylene fibers, and blends thereof. Suitable fibers include Kevlar® para-aramid fibers commercially available from DuPont, Wilmington, Del., or extended chain, high modulus polyethylene fibers commercially available under the tradename Spectra® from Honeywell International, Morristown, N.J., or Dyneema® from DSM in the Netherlands. The latter polyethylene fibers are preferably produced by a gel-spinning process, and have a beneficially low specific gravity and high strength at high strain rate. Any other high strength fiber may also be beneficially used in some embodiments, including metal or other polymer fibers and fibers comprising carbon nanotubes. For high speed applications, non-conductive fibers are preferred, but even carbon tow is less conductive than typical metallic materials used in prior art support structures.

It is preferred that a preponderance of the fibers in the reinforcement be unidirectionally oriented, i.e., oriented along the winding direction of the subassembly, so that the strength in this direction is enhanced. In the configuration of the rotor of FIG. 4, the fibers are thus oriented along the radial sides of the subassemblies, i.e. the direction along which the largest forces are typically experienced. Efficient use of the fibrous material is thus enhanced. Fibers oriented in other directions contribute minimally to the overall robustness of the rotor, yet are expensive to provide, and increase rotor mass and reduce the space available for active magnetic material.

In one preferred implementation of the present construction, reinforcement 18 is provided in the form of a prepreg, by which is meant a form of supply in which the reinforcing fiber is impregnated with an adhesive binder (usually an epoxy, polyurethane, polyimide, or other like synthetic resin) before being incorporated into the subassembly. The binder, provided either in the prepreg or otherwise added, may further comprise mineral or fibrous additions to enhance the mechanical or thermal properties of the final composite structure.

Figure 4:
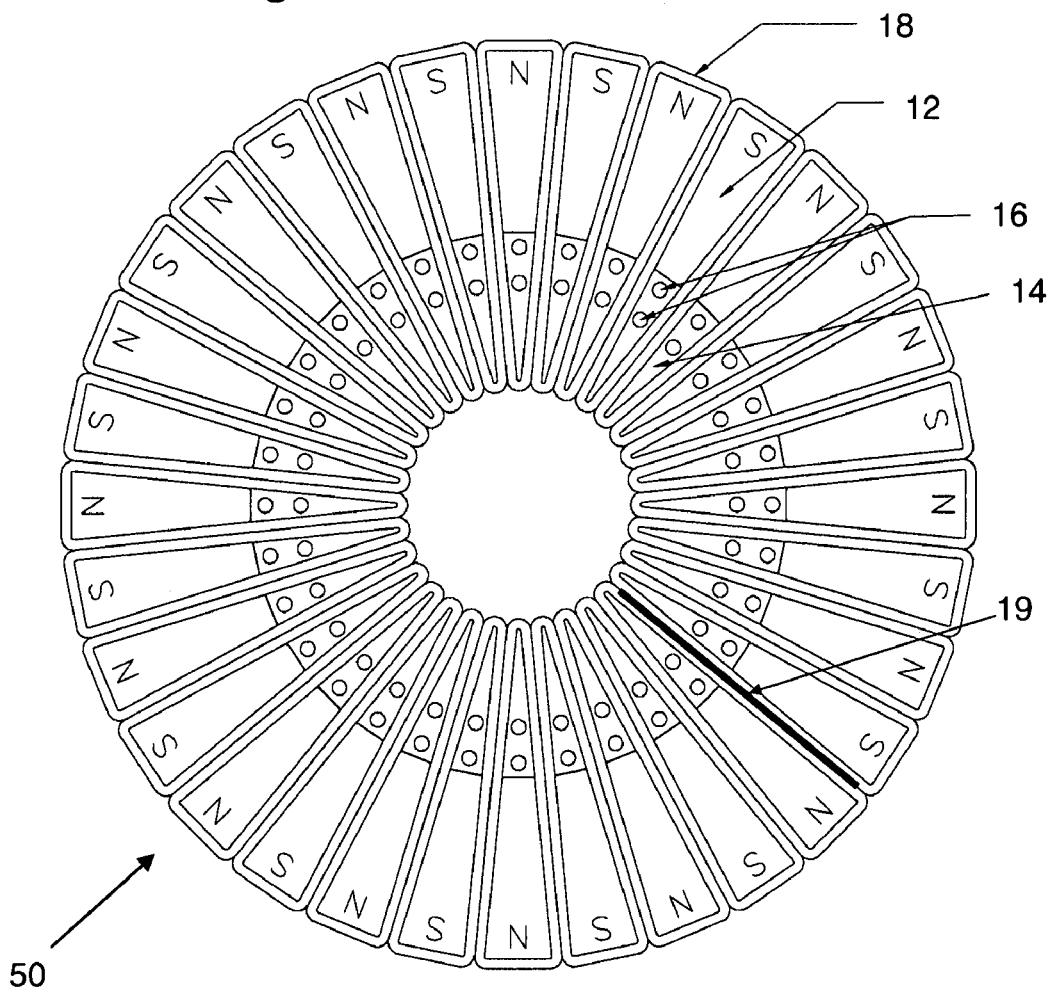
FIG. 4 depicts in a plan view a permanent magnet rotor for an axial airgap dynamoelectric machine constructed using the subassemblies of FIGS. 2-3.

Subassemblies 10 are shaped and sized so that a requisite plurality of them may be assembled into a generally annular rotor structure 50, e.g. as depicted by FIG. 4. Each subassembly 10 is generally wedge shaped and subtends an angle of about $\Theta$ degrees, with $\Theta=360°/2n$, wherein "n" is the desired number of pole pairs. Assembly of 2n such subassemblies thus results in the annular structure shown. The radial sides 20a, 20b of each subassembly are directed along a diameter of the final annulus. In the implementation shown, the rotor has 32 poles, or 16 pole pairs, but the techniques provided herein permit the construction of rotors having a wide range of pole count and diameter.

Figure 5:
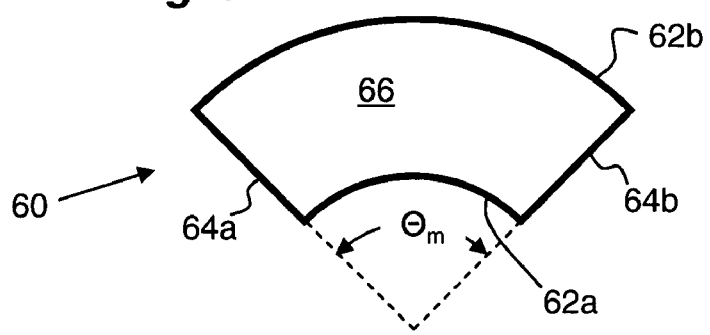
FIG. 5 depicts in a plan view a permanent magnet having the shape of a segment of an annulus and useful in the construction of one form of the present rotor.

Wedge-shaped magnets 12 can be trapezoidal in shape and have parallel inner and outer sides, as shown in FIG. 2. Alternatively, magnets 12 have the shape of a segment of an annulus. For example, FIG. 5 depicts an annular segment shape 60 subtending an angle $\Theta_m \approx 45°$ and useful for constructing an eight-pole rotor. In general, an n-pole rotor may be constructed with magnets such that $360°/2n=(\Theta_m+\Theta_s)$, wherein $\Theta_s$ is the angular width subtended by the spoke width between adjacent magnets. Annular segment 60 has arcuate inner and outer sides 62a, 62b and radial sides 64a, 64b that together define generally planar faces 66. Annular segments are preferred for a low pole count rotor. For high pole counts, a trapezoidal shape closely approximates a low-angle annular shape, and is generally less expensive to manufacture. Magnets 12 of either type are shaped so that the sides of the finished subassembly, including the magnet, encircling wrap 18, and any other optional support member, are radially directed. Such a configuration permits assembly of a balanced circular annulus, as further described herein.

Magnets 12 have a preferred magnetization direction that is directed substantially perpendicular to their faces, i.e., along either sense of the direction indicated by arrow M in FIG. 3. In the finished rotor, the magnets are magnetized in directions that are generally parallel to the rotation axis and in a sequence of alternating polarities, as indicated by N and S labeled poles in FIG. 4. The rotor magnets may be magnetized at any stage of the assembly, but practical considerations often dictate that high strength magnets, especially rare earth base magnets, be handled in their unmagnetized state and magnetized only after rotor assembly.

Structure 50 may be assembled by disposing the requisite number of magnet subassemblies 10 such that radial sides 20a, 20b of circumferentially adjacent ones of subassemblies 10 are aligned. In the FIG. 4 embodiment, the adjacent subassemblies are placed with the reinforcement 18 on their adjacent sides placed in abutment, thereby providing a relatively narrow spoke width that is only wide enough to accommodate the reinforcement 18 on each subassembly and interstitial adhesive. (By "spoke width" is understood the physical spacing between the sides of the respective magnets in adjacent subassemblies.) Segment sides 20a, 20b lie generally along radii of the circle formed in the completed annular rotor. In alternative implementations, a wider spoke width may be used to accommodate additional adhesive or a further structural support member. For example, a spacer, such as support member 19, may be placed between adjacent subassemblies, with the aggregate circumferential thickness of the spacer and reinforcement on each side being suitable to attain the desired final configuration. (It will be understood that while FIG. 4 depicts only one support member 19, similar members are ordinarily placed in plural spoke widths, and preferably all the spoke widths, to maintain mechanical and magnetic balance of the rotor structure.) Support member 19 may be composed of any suitable metallic or non-metallic material. In some implementations, support member 19 may comprise soft magnetic material used to direct magnetic flux. Additional binder of the same type as provided in the prepreg or another type may be added to assure sufficient bonding.

The spokes and permanent magnets of the present rotor configuration may subtend the rotor circumference in any suitable ratio. One method for selecting a ratio $\Theta_s/\Theta_m$ between the angular widths of the spokes and magnets is provided in a publication by F. Caricchi, F. Crescimbini, E. Sanimi, and C. Santucci, "FEM Evaluation of Performance of Axial Flux Slotted Permanent Magnet Machines", *IEEE Industry Applications Conference*, 1998, vol. 1, pp. 12-17. In a preferred configuration that reduces undesirable cogging and the concomitant back emf in the stator, the spoke width subtends an angle $\Theta_s$ such that the ratio $\Theta_s/[2\times(\Theta_s+\Theta_m)]$ ranges from about 0.9 to 0.16. It is found that values within the lower part of this range particularly reduce harmonic distortion of the back emf, with a value of about 0.97 being especially preferred. Values within the higher part of the range particularly reduce cogging, with a value of 0.153 being especially preferred. An intermediate value, such as a spoke width subtending an angle that is about one-eight the total angle of each pole pair, i.e. $\Theta_s/[2\times(\Theta_s+\Theta_m)]=\frac{1}{8}$, beneficially reduces both harmonic distortion and cogging. A rotor having a configuration within these ranges, which results in a relatively large spoke width, may beneficially employ a support member in each spoke width to achieve desirable strength and rigidity.

Some of the foregoing rotor configurations also rely on the one or more mounting holes 16 of each subassembly. These holes may be used in conjunction with an alignment fixture used to secure the magnet subassemblies in a preselected configuration. Preferably, the fixture aligns and evenly spaces the magnet subassemblies, and remains in place during the entire assembly and bonding/curing operations After the magnet 12 and optional filler section 14 of each subassembly 10 are configured in the desired, generally annular arrangement, the binder is exposed to a suitable condition, such as thermal or chemical treatment, as required to activate and cure the binder, and thereby bind the subassemblies to each other.

Figure 6:
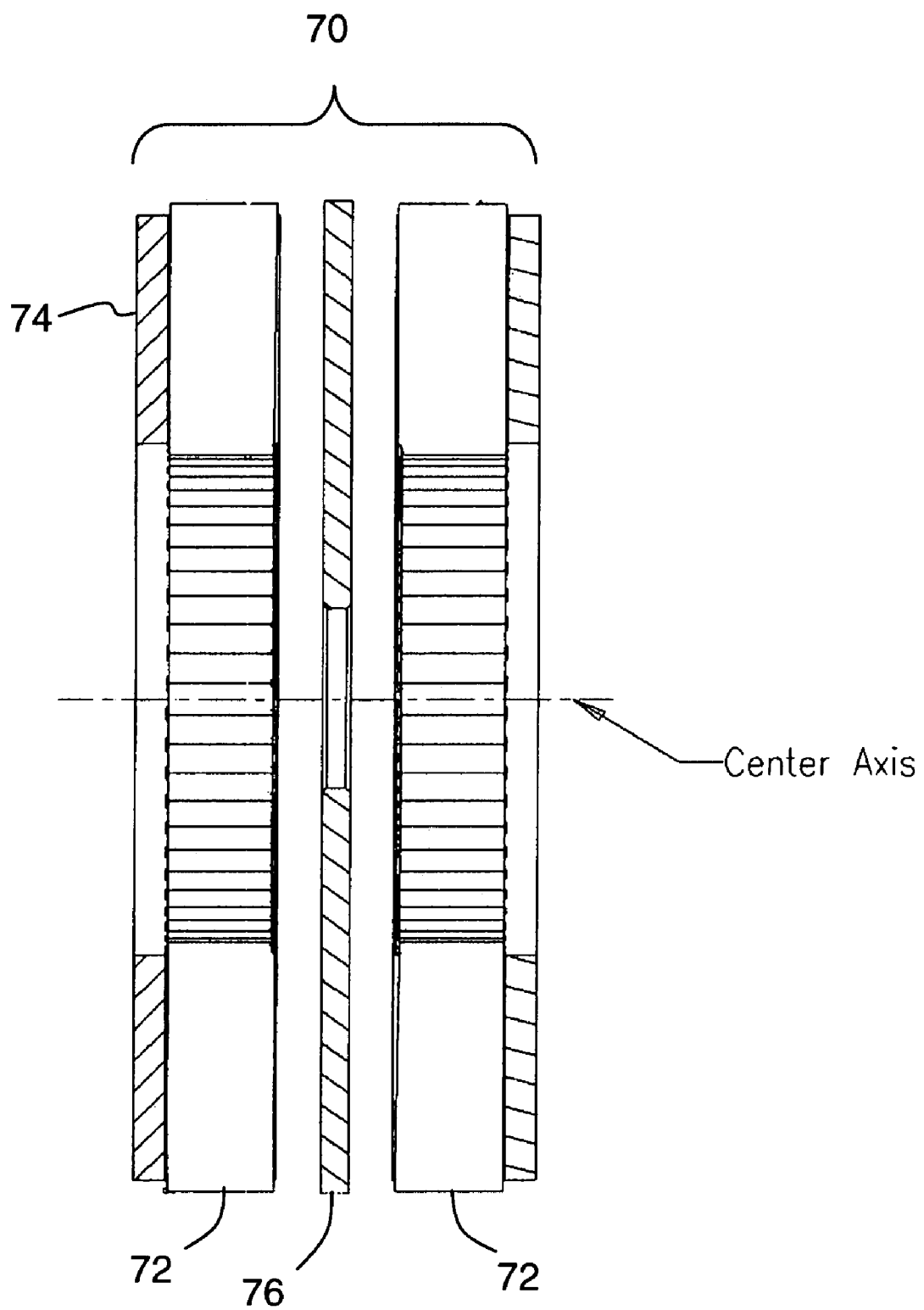
FIG. 6 depicts in a cross-sectional view an arrangement of two stators and a rotor therebetween for an axial airgap-type electric device of the invention.

The finished rotor structure, e.g. as depicted in FIGS. 4 and 6, is preferably planar, but may also be constructed with an axial-direction thickness that varies in the radial direction. For example, the thickness may be greater near the outside circumference for enhanced strength. In addition, the rotor may incorporate strengthening ribs or other similar structural features.

A composite form of support structure 2 could possibly be made by stacking layers of pre-preg with requisite cutouts for the magnet apertures, but there would be significant waste from the discarded material. In addition, such a prepreg would need to have biaxially or randomly oriented fibers to provide the requisite strength along the radial direction for spokes 8 that encompass all possible in-plane orientations. However, off-axis fibers contribute cost and weight that bring minimal benefit. Thus, the high amount of scrap and the need for isotropic strength both increase the cost of this approach significantly.

Substituting a non-metallic, composite structure, as provided herein, for a metallic support structure, such as structure 2 of the FIG. 1 rotor, reduces the overall rotor mass, and consequently, its rotational moment. For example, composite materials suitable for the present rotor structure may have a mass density of about 1.5 g/cm$^3$, whereas aluminum and stainless steels have densities of 2.7 and 8.0 g/cm$^3$. For the case of a 30 cm rare earth permanent magnet rotor in one embodiment, the resulting rotor inertias for the three support materials are 0.038, 0.043, and 0.065 kg-m$^2$, respectively.

The reduced moment in turn provides substantial operational benefits in some embodiments. A reduced inertia rotor permits a machine to respond quickly to changes in load or driving torque. For example, in a wind turbine generator application, a low inertia rotor allows the machine to accommodate slight changes in wind speed, such as efficiently extracting the extra energy in a wind gust. Lighter rotors also allow less robust bearings to be used, which in turn reduces friction. Low inertia is also valuable in many motoring applications. For driving machine tools and conveyors, low inertia facilitates quick acceleration at startup. Low inertia also permits braking resistors used for deceleration to be made smaller and to dissipate less waste heat when the machinery is slowed or stopped.

Weight reduction itself is often beneficial, especially for vehicular and aerospace applications, in which fuel is saved by reducing static weight that must be carried. Although some fibers, such as carbon tow, are somewhat conductive, the present composite rotor minimizes or eliminates the large-scale conductive pathways of the FIG. 1 rotor, thereby mitigating deleterious circulating eddy current effects.

In another aspect there is provided an electric machine incorporating one or more rotors of the type described above and one or more stators. A preferred embodiment of the present device employs an axial-airgap configuration comprising at least one stator assembly including a unitary magnetic core having a number of slots. The slots are wound with stator windings. The electro-magnetic device also includes at least one rotor assembly including a plurality of rotor poles. The rotor assembly is arranged and disposed for magnetic interaction with the at least one stator. The electromagnetic device is preferably capable of operating continuously under excitation at frequencies higher than 400 Hz.

One form of such a stator useful in constructing the present machine is provided by U.S. Pat. No. 7,067,950 to Hirzel, which is incorporated herein in its entirety by reference thereto. It is to be understood the terms "a rotor" and "a stator" as used herein with reference to the present electric machine mean a number of rotor and stator assemblies ranging from one to as many as three or more.

FIG. 6 illustrates a side view of one possible embodiment 70 of the present electric device. Two stators 72 with backing plates 74 are positioned facing opposite sides of a single rotor 76. The stators and rotor are located along a common center axis. Such a configuration beneficially reduces axial thrust on the rotor, since the attraction between the rotor and the respective stators is oppositely directed and substantially offset. Though the FIG. 6 topology requires enough soft magnetic material to form two stators, the cost is generally more than offset by the efficient use of the more expensive permanent magnet material. Rotor 76 is typically secured to a rotating shaft (not shown) that is supported by a bearing means, which may include mechanical bearings, air or gas bearings, or magnetic bearings.

By far, the preponderance of dynamoelectric machines currently produced use as soft magnetic material various grades of electrical or motor steels, which are alloys of Fe with one or more alloying elements, especially including Si, P, C, and Al. Most commonly, Si is a predominant alloying element and the material is non-oriented. The present electric machine may be employed with stators using these conventional soft magnetic materials, but it is preferred that the stator have a magnetic core comprising advanced, low-loss soft materials. The low losses of these materials permit high frequency excitation, which is beneficially used in conjunction with a high pole count permanent magnet rotor of the present construction.

Representative examples of advanced, low-loss soft materials include certain amorphous metals, nanocrystalline metals, and optimized Fe-based alloys. The latter are crystalline materials that may be either grain-oriented or non-grain-oriented materials. Preferred, advanced, low-loss soft-magnetic materials are characterized by a core loss less than "L" where L is given by the formula $L=12 \cdot f \cdot B^{1.5} + 30 \cdot f^{2.3} \cdot B^{2.3}$, where L is the loss in W/kg, f is the frequency in KHz, and B is the peak magnetic flux density in Tesla. The use of one or more of these materials enables the device's excitation frequency to be increased above 400 Hz with only a relatively small increase in core loss, as compared to the large increase exhibited in conventional machines. The resulting device is highly efficient and capable of providing increased power.

The incorporation of amorphous, nanocrystalline, or optimized Fe-based materials in the preferred electrical device enables the machine's frequency to be increased above typical line frequencies (50-60 Hz) to values as high as 400 Hz or more with only a relatively small increase in core loss, as compared to the large increase exhibited in conventional machines using conventional magnetic core materials, such as commercial Si—Fe alloys. The use of the low-loss materials in the stator core allows the development of the high-frequency, high pole count, electric devices capable of providing increased power density, improved efficiency, and a more square torque-speed curve. Preferably the stator assembly comprises at least one material selected from the group consisting of amorphous, nanocrystalline, or optimized Fe-based alloy.

Designers traditionally have avoided high pole counts for high speed machines, since conventional stator core materials, such as Si—Fe, cannot operate at the proportionately higher frequencies necessitated by the high pole count. In particular, known devices using Si—Fe cannot be switched at magnetic frequencies significantly above 400 Hz due to core losses resulting from changing magnetic flux within the material. Above that limit, core losses cause the material to heat to the point that the device cannot be cooled by any acceptable means. Under certain conditions, the heating of the Si—Fe material may even be severe enough that the machine cannot be cooled whatsoever, and will self-destruct. However, it has been determined that the low-loss characteristics of suitable amorphous, nanocrystalline and optimized Fe-based metals allow much higher switching rates than possible with conventional Si—Fe materials. While, in a preferred embodiment, the choice of amorphous metal alloy, such as Metglas® 2605SA1 alloy, removes the system limitation due to heating at high frequency operation, the winding configuration, rotor design, and overall machine configuration are also improved to take better advantage of the beneficial properties of the amorphous material.

The ability to use much higher exciting frequencies, in combination with improved rotor construction, permits the present machine to be designed with a much wider range of possible pole counts. Subject to allowable exciting frequency limits, the number of poles can be increased until magnetic flux leakage increases to an undesirable value, or performance begins to decrease.

Hence, preferred embodiments of the present machine ordinarily has about 4 or 5 times the number of poles typical for current industrial machines of comparable physical size.

As an example, for an industry typical motor having 6 to 8 poles, for motors at speeds of about 800 to 3600 rpm, the commutating frequency is about 100 to 400 Hz. Also available in industry are high pole count of greater than about 16 poles, but speeds of less than 1000 rpm, which still corresponds to a frequency less than 300 Hz. Alternatively, motors are also available with a relatively low pole count (of less than about 6 poles), and with speeds up to 3000 rpm, which still have a commutating frequency less than about 400 Hz. In different embodiments, the present invention provides machines that are, for example, 96 poles, 1250 rpm, at 1000 Hz; 54 poles, 3600 rpm, at 1080 Hz; 4 poles, 30000 rpm, at 1000 Hz; and 2 poles, 60000 rpm, at 1000 Hz. The motors of the invention therefore provide factors of 4 or 5 higher frequencies when compared to "standard" motors. The motors of the invention are more efficient than typical motors in the industry when operated in the same speed range, and as a result provide greater speed options.

Pole and slot counts in the preferred machine may be as large as 96 or more. For certain low-speed devices, such as wind-driven generators, even higher values (double or more) are preferred. The machines provided are generally more efficient than typical devices in the industry when operated in the same speed range, and as a result provide greater range of possible speeds. The present configuration is particularly attractive for the construction of machines having a very wide range of speed, power, and torque ratings, in a manner that combines high energy efficiency, high power density, ease of assembly, and efficient use of expensive soft and hard magnetic materials.

The slot per phase per pole (SPP) value of an electric machine is determined by dividing the number of stator slots by the number of phases in the stator winding and the number of DC poles (SPP=slots/phases/poles). In the present description and calculation of SPP values, a pole refers to the non-time-varying magnetic field, also referred to herein as a DC field, which interacts with a changing magnetic field, i.e., one that varies in magnitude and direction with both time and position. In the present device, the rotor permanent magnets provide the DC field, and hence the number of non-time-varying magnetic poles, referred to herein as DC poles. The electromagnets of the stator windings provide the changing magnetic field, i.e., one that varies with both time and position. A slot refers to the spacing between alternating teeth of the stator of the present machine. The number of poles is twice the number of pole pairs that each stator tooth encounters during each rotation of the rotor.

Conventional machines are frequently designed to have an SPP ratio of 1 to 3 to obtain acceptable functionality and noise levels and to provide smoother output due to better winding distribution. SPP ratios of 1 or more inherently require distributed turns. However, designs with a fractional SPP value, e.g. 0.5, have been sought to reduce the effect of end turns. End turns are the portions of wire in the stator coils that connect the windings between slots. Although such connection is, of course, required, the end turns do not contribute to the torque and power output of the machine, but still increase the total amount and length of wire required and contribute ohmic losses to the machine while providing no benefit. Low SPP values in conventional configurations also tend to raise levels of power electronics ripple and the attendant, deleterious torque variations. Hence, one goal of the machine designer is to minimize end turns, while still providing a machine with manageable noise and cogging and low power electronics ripple.

However, it is surprising and unexpected that use of advanced, low core loss materials allows slot and pole count and commutating frequency to be raised concomitantly, so that noise and cogging can be kept to acceptable levels. Thus, the present machine is preferably implemented with an SPP ratio ranging from about 0.25 to 4.0.

For example, a four-phase configuration may have 48 slot and 36 poles, resulting in an SPP=0.33, while a three-phase embodiment might have 48 slots and 64 poles for an SPP=0.25. In different representative embodiments, the SPP ratio is 0.25, 0.33, 0.5, 0.75, 1.0, or greater than 1.0. More preferably, the SPP ratio ranges from about 0.25 to 1. In a still more preferred embodiment, the SPP ratio ranges from about 0.25 to 0.5.

Embodiments in which multiple slots are wired into a common magnetic section have an SPP greater than 0.5. This is the result of there being a greater number of stator slots than rotor poles, resulting in a distributed winding. On the other hand, a value of SPP less than or equal to 0.5 indicates that there are no distributed windings. A convention in the industry is to include distributed windings in the stator. However, distributed windings will raise the value of SPP, and reduce the frequency.

In some embodiments, machines having fractional SPP ratios and non-distributed windings beneficially employ modular coils. As used herein, the term "distributed winding" is signifies a stator coil in which the windings encircle a plurality of teeth instead of a single tooth, as described hereinabove. The modular coils optionally used in the present machine can be pre-formed and then slipped over single tooth sections that are not tapered. While a three-phase, wye-connected configuration is an industry convention, delta connection is also contemplated. The present machine can also employ windings that are disposed in a stacked configuration, as disclosed in the commonly owned U.S. patent application Ser. No. 10/979,336. However, any winding arrangement known in the art is applicable. The windings may be formed in place around the teeth, or they may be separately prepared as an assembly and slipped over the tooth ends.

Furthermore, in preferred implementations of the present electric machine, relatively high pole counts and an SPP ratio of 0.5 or less are among the factors permitting the magnets of the rotor (and the rotor structure in general) to be made thinner and less expensively.

It will be understood that the present invention may be practiced using different materials and production methods. For example, different materials may be used in the production processes set forth herein and the various mechanical steps may be carried out in a difference sequence and with other suitable mechanical techniques. In addition, one skilled in the relevant art will recognize that the present assemblies, devices and systems may be practiced without one or more of these specific details, or with other methods, components, materials, etc. In other instances, well-known structures associated with electric machines have not been shown or described in detail to avoid unnecessarily obscuring descriptions of the embodiments of the present assemblies, devices and systems.

Unless the context requires otherwise, throughout the specification and claims which follow, the word "comprise" and variations thereof, such as, "comprises" and "comprising" are to be construed in an open, inclusive sense, that is as "including, but not limited to." Reference throughout this specification to "one embodiment" or "an embodiment" means that a particular feature, structure or characteristic described in connection with the embodiment is included in at least one embodiment of the present assemblies, devices and systems. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A rotor for an axial airgap, dynamoelectric machine, the rotor being adapted to be supported for rotation about a rotation axis and comprising a plurality of magnet subassemblies, wherein:
   a. each magnet subassembly:
      i. has opposing subassembly faces and a periphery defined by two radial sides and inner and outer sides;
      ii. comprises a rotor magnet having substantially parallel opposing faces and appointed to be magnetized along a preferred magnetization direction that is substantially perpendicular to the opposing faces; and
      iii. is wrapped with a fibrous belt having a length direction extending around the periphery of the magnet subassembly, the belt providing high tensile strength at least along the radial sides of the magnet subassembly; and
      iv. wherein the magnet subassemblies are shaped to permit the plurality of subassemblies to be assembled collectively into an annulus by joining circumferentially adjacent ones of the assemblies along their adjacent radial sides; and
   b. the plurality of magnet subassemblies are configured to form an annulus, the preferred magnetization directions of the magnets being substantially parallel to the rotation axis, and adjacent radial sides of circumferentially adjacent ones of the magnet subassemblies are adhesively bonded to one another with an adhesive to form the rotor.

2. A rotor as recited by claim 1, wherein the fibrous belt is provided as a prepreg comprising fibers impregnated with the adhesive.

3. A rotor as recited by claim 1, wherein the fibrous belt comprises fibers of at least one fiber type selected from the group consisting of carbon, glass, para-aramid, extended chain high modulus polyethylene fibers, and blends thereof.

4. A rotor as recited by claim 1, wherein the fibers are carbon tow.

5. A rotor as recited by claim 1, wherein the adhesive is an epoxy resin.

6. A rotor as recited by claim 1, wherein a preponderance of the fibers of the fibrous belt are aligned along the length direction.

7. A rotor as recited by claim 1, wherein substantially all the fibers of the fibrous belt are aligned along the length direction.

8. A rotor as recited by claim 1, wherein each magnet subassembly further comprises a spacer located radially inward of the rotor magnet of the subassembly and the fibrous belt encircles the spacer and the magnet collectively.

9. A rotor as recited by claim 1, wherein each magnet subassembly further comprises a soft magnetic element.

10. A rotor as recited by claim 1, wherein the rotor magnets are rare earth magnets.

11. A rotor as recited by claim 1, wherein the rotor magnet of each magnet subassembly comprises a plurality of rotor magnet pieces.

12. A rotor as recited by claim 1, wherein each of the adjacent faces is separated by a spoke width and a support member is present within at least a plurality of the spoke widths.

13. A process for constructing a rotor for an axial air-gap, dynamoelectric machine wherein the rotor is supported for rotation about a rotation axis, the process comprising the steps of:
   a. providing a plurality of magnet subassemblies, each subassembly:
      i. having opposing subassembly faces and a periphery defined by two radial sides and inner and outer sides;
      ii. comprising a rotor magnet having substantially parallel opposing faces and appointed to be magnetized along a preferred magnetization direction that is substantially perpendicular to the opposing faces; and
      iii. being wrapped by a fibrous belt having a length direction extending around the periphery of the magnet subassembly, the belt providing high tensile strength at least along the radial sides of the magnet subassembly; and
      wherein the magnet subassemblies are shaped to permit the plurality of subassemblies to be assembled collectively into an annulus by joining circumferentially adjacent ones of the subassemblies along their adjacent radial sides;
   b. disposing the magnet subassemblies to form an annulus, the preferred magnetization directions of the magnets being substantially parallel to the rotation axis;
   c. supplying an adhesive at least between the adjacent radial sides of circumferentially adjacent ones of the magnet subassemblies;
   d. activating the adhesive to bond the magnet subassemblies to form the rotor.

14. A process as recited by claim 13, wherein the adhesive is an epoxy resin.

15. A process as recited by claim 13, wherein the fibrous belt is provided as a prepreg comprising fibers impregnated with the adhesive.

16. A process as recited by claim 13, wherein the fibrous belt comprises fibers of at least one fiber type selected from the group consisting of carbon, glass, para-aramid, and extended chain high modulus polyethylene fibers, and blends thereof.

17. A process as recited by claim 16, wherein the fibers are carbon tow.

18. A process as recited by claim 15, wherein a preponderance of the fibers of the fibrous belt are aligned along the length direction.

19. A process as recited by claim 18, wherein substantially all the fibers of the fibrous belt are aligned along the length direction.

20. A process as recited by claim 13, wherein each magnet subassembly further comprises a spacer located radially inward of the rotor magnet of the subassembly and the fibrous belt encircles the spacer and the magnet collectively.

21. A process as recited by claim 13, wherein each magnet subassembly further comprises a soft magnetic element.

22. A process as recited by claim 13, wherein the rotor magnets are rare earth magnets.

23. A process as recited by claim 13, wherein the rotor magnet of each magnet subassembly comprises a plurality of rotor magnet pieces.

24. A process as recited by claim 13, wherein each of the adjacent faces is separated by a spoke width.

25. A process as recited by claim 24, further comprising the step of:
   e. providing a support member within each of the spoke widths.

26. A process as recited by claim 24, wherein the fibrous belt is provided as a prepreg comprising fibers impregnated with the adhesive and the process further comprises the step of:
   f. providing additional adhesive within each of the spoke widths and activating that adhesive.

27. A process as recited by claim 13, wherein an alignment fixture is used to secure the magnet subassemblies in a preselected configuration during at least the disposing step.

28. A process as recited by claim 13, further comprising the step of:
   g. magnetizing the rotor magnets such that equal numbers of the rotor magnets are provided in each magnetization direction.

29. A process as recited by claim 13, further comprising the step of:
   h. securing the rotor magnet assembly to a shaft.

30. In an axial airgap, dynamoelectric machine comprising at least one stator and at least one rotor supported for rotation about a rotation axis, the improvement wherein the rotor comprises a plurality of magnet subassemblies, wherein:
   a. each magnet subassembly:
      i. has opposing subassembly faces and a periphery defined by two radial sides and inner and outer sides;
      ii. comprising a rotor magnet having substantially parallel opposing faces and appointed to be magnetized along a preferred magnetization direction that is substantially perpendicular to the opposing faces; and
      iii. is wrapped by a fibrous belt having a length direction extending around the periphery of the magnet subassembly, the belt providing high tensile strength at least along the radial sides of the magnet subassembly; and
      iv. wherein the magnet subassemblies are shaped to permit the plurality of subassemblies to be assembled collectively into an annulus by joining circumferentially adjacent ones of the assemblies along their adjacent radial sides; and
   b. the plurality of magnet subassemblies are configured to form an annulus, the preferred magnetization directions of the magnets being substantially parallel to the rotation axis, and adjacent radial sides of circumferentially adjacent ones of the magnet subassemblies are adhesively bonded to one another with an adhesive to form the rotor.

31. For use in a rotor of an axial airgap, dynamoelectric machine, a rotor magnet sub-assembly:
   a. having opposing subassembly faces and a periphery defined by two radial sides and inner and outer sides;
   b. comprising a rotor magnet having substantially parallel opposing faces and appointed to be magnetized along a preferred magnetization direction that is substantially perpendicular to the opposing faces; and
   c. being wrapped by a fibrous belt having a length direction extending around the periphery of the magnet subassembly, the belt providing high tensile strength at least along the radial sides of the magnet subassembly; and
   d. wherein the magnet subassemblies are shaped to permit the plurality of subassemblies to be assembled collectively into an annulus by joining circumferentially adjacent ones of the assemblies along their adjacent radial sides.

32. A rotor as recited by claim 1, wherein each of the adjacent faces is separated by a spoke width subtending an angle $\Theta_s$ and each magnet subtends an angle $\Theta_m$, and the ratio $\Theta_s/[2\times(\Theta_s+\Theta_m)]$ ranges from about 0.9 to 0.16.

33. A rotor as recited by claim 32, wherein the ratio $\Theta_s/[2\times(\Theta_s+\Theta_m)]$ is about ⅛.

* * * * *